United States Patent
Pan et al.

(10) Patent No.: US 12,033,353 B2
(45) Date of Patent: Jul. 9, 2024

(54) POSE IDENTIFYING APPARATUS, POSE IDENTIFYING METHOD, AND NON-TRANSITORY COMPUTER READABLE MEDIUM

(71) Applicant: NEC Corporation, Tokyo (JP)

(72) Inventors: Yadong Pan, Tokyo (JP); Shoji Nishimura, Tokyo (JP)

(73) Assignee: NEC CORPORATION, Tokyo (JP)

(*) Notice: Subject to any disclaimer, the term of this patent is extended or adjusted under 35 U.S.C. 154(b) by 352 days.

(21) Appl. No.: 17/627,903

(22) PCT Filed: Jul. 22, 2019

(86) PCT No.: PCT/JP2019/028644
§ 371 (c)(1),
(2) Date: Jan. 18, 2022

(87) PCT Pub. No.: WO2021/014530
PCT Pub. Date: Jan. 28, 2021

(65) Prior Publication Data
US 2022/0277482 A1    Sep. 1, 2022

(51) Int. Cl.
*G06T 7/73*    (2017.01)
*G06V 40/10*    (2022.01)

(52) U.S. Cl.
CPC .............. *G06T 7/75* (2017.01); *G06V 40/103* (2022.01); *G06T 2207/30196* (2013.01)

(58) Field of Classification Search
CPC ............ G06T 7/75; G06T 2207/30196; G06V 40/103
See application file for complete search history.

(56) References Cited

U.S. PATENT DOCUMENTS

2015/0003687 A1\*  1/2015  Utsunomiya .......... G06V 40/25
                                                                        382/107
2015/0294481 A1\*  10/2015  Sakaue .................. G06V 40/23
                                                                        600/595

(Continued)

FOREIGN PATENT DOCUMENTS

JP        2012-133666 A    7/2012
WO     2007/102537 A1    9/2007

OTHER PUBLICATIONS

International Search Report for PCT Application No. PCT/JP2019/028644, dated Oct. 1, 2019.

*Primary Examiner* — Samir A Ahmed
(74) *Attorney, Agent, or Firm* — Sughrue Mion, PLLC (57) ABSTRACT

A basic pattern extracting unit (15) extracts a "basic pattern" for each human from detection points acquired by an acquiring unit (11). The "basic pattern" includes a "reference body region point" corresponding to a "reference body region type", and base body region points corresponding to base body region types that are different from the reference body region type and that are different from each other. For example, the "basic pattern" includes at least one of the following two combinations. A first combination is a combination of the reference body region point corresponding to a neck as the reference body region type and two base body region points respectively corresponding to a left shoulder and a left ear as the base body region type. A second combination is a combination of body region points corresponding to a neck, a right shoulder and a right ear.

11 Claims, 9 Drawing Sheets

(56) References Cited

U.S. PATENT DOCUMENTS

| | | |
|---|---|---|
| 2015/0310629 A1 | 10/2015 | Utsunomiya et al. |
| 2015/0325270 A1* | 11/2015 | Utsunomiya .......... G16H 30/20 386/230 |
| 2018/0293753 A1 | 10/2018 | Varadarajan et al. |
| 2020/0126297 A1* | 4/2020 | Tian ......................... G06T 7/75 |

* cited by examiner

$$La = \begin{cases} \min(\overline{N_0N_1}, \overline{N_0N_2}) & (N_1 \text{ and } N_2 \text{ exist}) \\ \overline{N_0N_1} & (N_2 \text{ not exist}) \\ \overline{N_0N_2} & (N_1 \text{ not exist}) \end{cases}$$

$$Lb = \begin{cases} \min(\overline{N_0N_3}, \overline{N_0N_4}) & (N_3 \text{ and } N_4 \text{ exist}) \\ \overline{N_0N_3} & (N_4 \text{ not exist}) \\ \overline{N_0N_4} & (N_3 \text{ not exist}) \end{cases}$$

$$Lc = \begin{cases} \min(\overline{N_0M_0}, \overline{N_0M_1}) & (M_0 \text{ and } M_1 \text{ exist}) \\ \overline{N_0M_0} & (M_1 \text{ not exist}) \\ \overline{N_0M_1} & (M_0 \text{ not exist}) \\ La+Lb+1 & (M_0 \text{ and } M_1 \text{ not exist}) \end{cases}$$

$$\text{Base length} = \begin{cases} Lc & (Lc \leq La+Lb,\ Lb \leq La*2) \\ Lc*1.17 & (Lc \leq La+Lb,\ Lb > La*2) \\ La+Lb & (Lc > La+Lb,\ Lb \leq La*2) \\ Lb*1.7 & (Lc > La+Lb,\ Lb > La*2) \end{cases}$$

($M_0$ and $M_1$ represent the closest $M_0$ and $M_1$ to $N_0$)

Fig. 7

| Order of association | Type of link | Requiring mid-point | Maximum length |
|---|---|---|---|
| 1 | Shoulder-Elbow | Yes | 1.5 * base length |
| 2 | Elbow-Wrist | Yes | 1.5 * base length |
| 3 | Shoulder-Hip | Yes | 2.0 * base length |
| 4 | Hip-Knee | Yes | 2.0 * base length |
| 5 | Knee-Ankle | Yes | 2.0 * base length |
| 6 | Neck-Nose | No | 1.0 * base length |
| 7 | Nose-Eye | No | 0.5 * base length |

POSE IDENTIFYING APPARATUS, POSE IDENTIFYING METHOD, AND NON-TRANSITORY COMPUTER READABLE MEDIUM

TECHNICAL FIELD

The present disclosure relates to a pose identifying apparatus, a pose identifying method, and a non-transitory computer readable medium storing a program.

BACKGROUND ART

A technique of identifying a pose of each person in an image including a plurality of person images respectively corresponding to a plurality of humans has been proposed (e.g., Patent Literature 1). The technique disclosed in Patent Literature 1 detects a plurality of body region points for a human in the image, and identifies the human's head from among the plurality of detected body region points so as to identify the human in the image. Then, the pose of the human is identified by associating the detected human body region point with another detected body region point.

CITATION LIST

Patent Literature

PTL 1: US Patent Application Publication No. 2018/0293753

SUMMARY OF INVENTION

Technical Problem

However, in the technique disclosed in Patent Literature 1, the person in the image is identified based only on his/her head. For this reason, for example, when the resolution of the image is low, the accuracy of the identification may decrease.

An object of the present disclosure is to provide a pose identifying apparatus, a pose identifying method, and a non-transitory computer readable medium storing a program which can improve accuracy of identifying a person in an image including a plurality of person images.

Solution to Problem

A first example aspect is a pose identifying apparatus including:
  acquiring means for acquiring information about a position and a body region type of each of a plurality of detection points detected for a plurality of predetermined body region points for a human in an image, where the image includes a plurality of person images respectively corresponding to a plurality of humans; and
  control means for identifying a pose of each human by classifying the respective detection points into any one of the plurality of humans, wherein
  the control means comprises basic pattern extracting means for extracting a basic pattern for each human, and
  the basic pattern includes a reference body region point and a plurality of base body region points, where the reference body region point corresponds to a reference body region type, and the plurality of base body region points corresponds to a plurality of base body region types that are different from the reference body region type and that are different from each other.

A second example aspect is a pose identifying method including:
  acquiring information about a position and a body region type of each of a plurality of detection points detected for a plurality of predetermined body region points for a human in an image, where the image includes a plurality of person images respectively corresponding to a plurality of humans; and
  identifying a pose of each human by classifying the respective detection points into any one of the plurality of humans, wherein
  the identifying of the pose of each human comprises extracting a basic pattern for each human, and
  the basic pattern includes a reference body region point and a plurality of base body region points, where the reference body region point corresponds to a reference body region type, and the plurality of base body region points corresponds to a plurality of base body region types that are different from the reference body region type and that are different from each other.

A third example aspect is a non-transitory computer readable medium storing a program that causes a pose identifying apparatus to execute processing including:
  acquiring information about a position and a body region type of each of a plurality of detection points detected for a plurality of predetermined body region points for a human in an image, where the image includes a plurality of person images respectively corresponding to a plurality of humans; and
  identifying a pose of each human by classifying the respective detection points into any one of the plurality of humans, wherein
  the identifying of the pose of each human comprises extracting a basic pattern for each human, and
  the basic pattern includes a reference body region point and a plurality of base body region points, where the reference body region point corresponds to a reference body region type, and the plurality of base body region points corresponds to a plurality of base body region types that are different from the reference body region type and that are different from each other.

Advantageous Effects of Invention

According to the present disclosure, it is possible to provide a pose identifying apparatus, a pose identifying method, and a non-transitory computer readable medium storing a program which can improve accuracy of identifying a person in an image including a plurality of person images.

DESCRIPTION OF EMBODIMENTS

Hereinafter, embodiments will be described with reference to the drawings. In the embodiments, the same or equivalent elements will be denoted by the same reference signs, and repeated descriptions will be omitted.

First Embodiment

Figure 1:
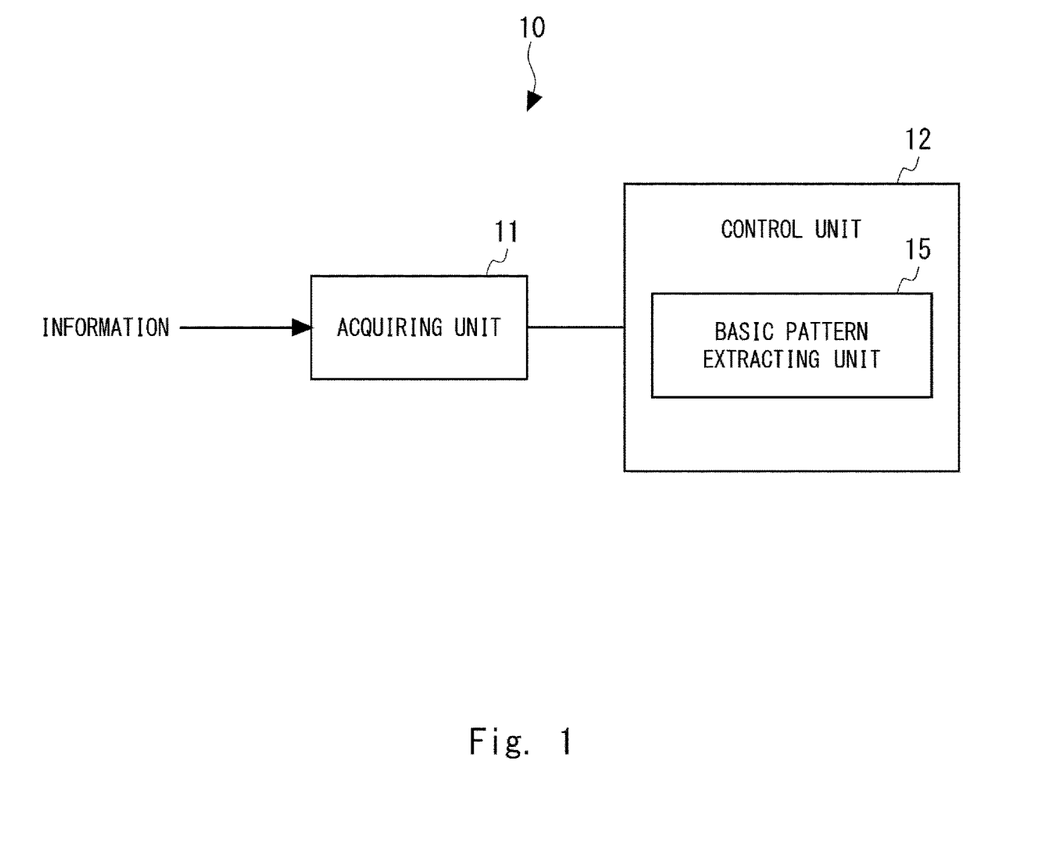
FIG. 1 is a block diagram showing an example of a pose identifying apparatus according to a first embodiment.

FIG. 1 is a block diagram showing an example of a pose identifying apparatus according to a first embodiment. In FIG. 1, a pose identifying apparatus 10 includes an acquiring unit 11 and a control unit 12.

The acquiring unit 11 acquires information about a position and a body region type of each of a "plurality of detection points" in an image. The "plurality of detection points" are body region points detected, for example, by a neural network (not shown) as a plurality of predetermined body region points for a human in an image including a plurality of person images corresponding to respective humans. The body region point may be referred to as a key point.

The control unit 12 classifies the respective detection points into any one of the plurality of humans to thereby identify a pose of the human. The control unit 12 includes a basic pattern extracting unit 15 that extracts a "basic pattern" for each human from the plurality of detection points acquired by the acquiring unit 11. The "basic pattern" includes a "reference body region point" corresponding to a "reference body region type", and a plurality of base body region points corresponding to a plurality of base body region types that are different from the reference body region type and that are different from each other.

For example, the "basic pattern" includes at least one of the following two combinations. A first combination is a combination of the reference body region point corresponding to a neck as the reference body region type and two base body region points respectively corresponding to a left shoulder and a left ear as the base body region type. A second combination is a combination of the reference body region point corresponding to a neck as the reference body region type and two base body region points respectively corresponding to a right shoulder and a right ear as the base body region type. That is, the "basic pattern" corresponds to a core part that is most stably detectable in a human body in images. Hereinafter, the "basic pattern" may be referred to as a core.

As described above, according to the first embodiment, the basic pattern extracting unit 15 in the pose identifying apparatus 10 extracts the "basic pattern" for each human from the plurality of detection points acquired by the acquiring unit 11. The "basic pattern" includes the "reference body region point" corresponding to the "reference body region type", and the plurality of base body region points corresponding to the plurality of base body region types that are different from the reference body region type and that are different from each other.

According to such a configuration of the pose identifying apparatus 10, the above-described basic pattern including three or more body region points can be extracted as a "core part" of a human. By doing so, the accuracy of identifying the person included in the image can be improved.

Second Embodiment

A second embodiment relates to details of the extraction of the above-described basic pattern.

Configuration Example of Pose Identifying Apparatus

Figure 2:
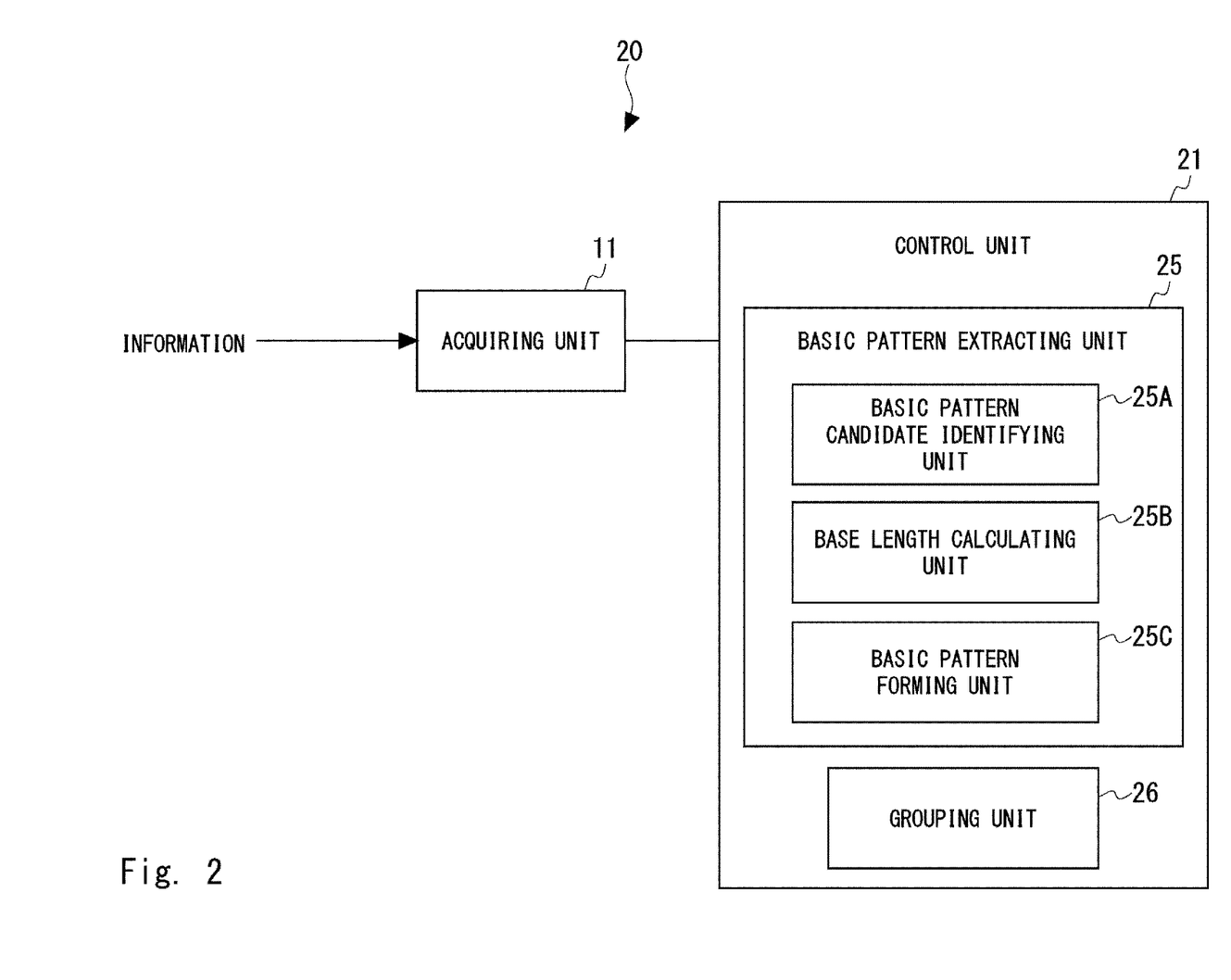
FIG. 2 is a block diagram showing an example of a pose identifying apparatus according to a second embodiment.

FIG. 2 is a block diagram showing an example of a pose identifying apparatus according to the second embodiment. In FIG. 2, a pose identifying apparatus 20 includes an acquiring unit 11 and a control unit 21.

As described above, the acquiring unit 11 acquires information about a position and a body region type of each of a "plurality of detection points" in an image. The "plurality of detection points" are body region points detected, for example, by a neural network (not shown) as a "plurality of predetermined body region points for a human" in an image including a plurality of person images corresponding to respective humans.

Figure 3:
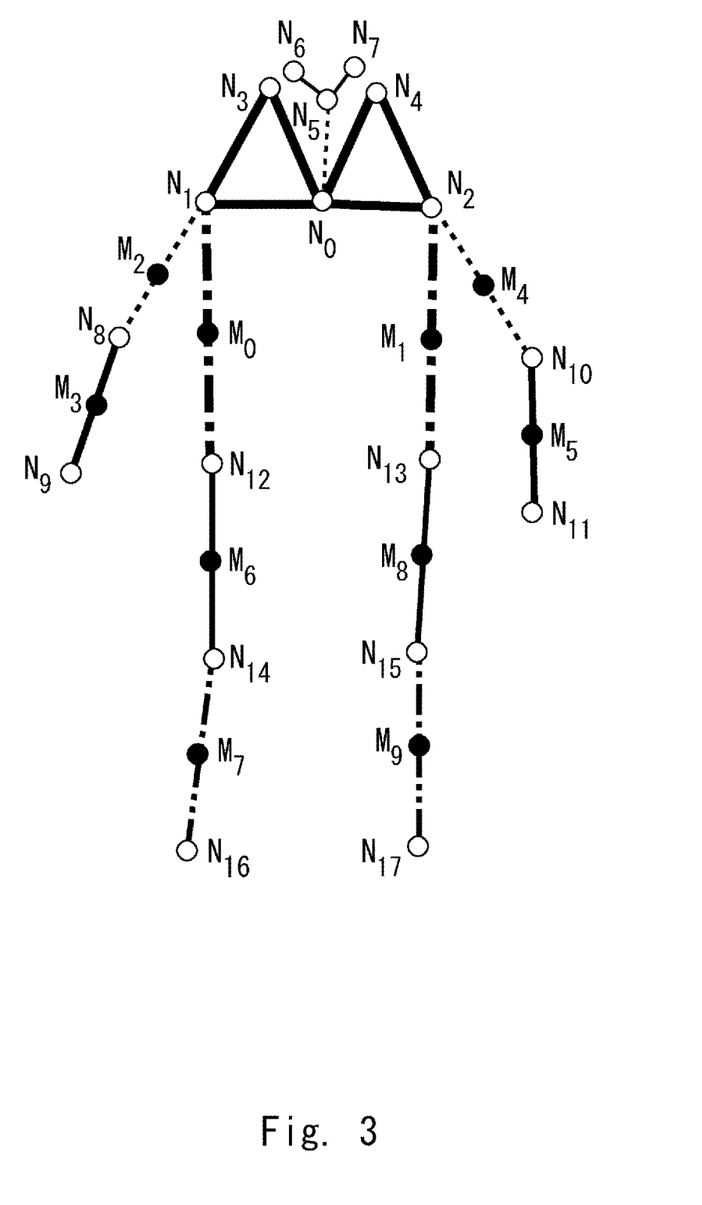
FIG. 3 is a diagram showing an example of a plurality of predetermined body region points for a human.

FIG. 3 is a diagram showing an example of the plurality of predetermined body region points for a human. In FIG. 3, the "plurality of predetermined body region points" for a human include body region points N0 to N17 and M0 to M9. As shown in FIG. 3, the body region point N0 corresponds to a neck. The body region point N1 corresponds to a right shoulder. The body region point N2 corresponds to a left shoulder. The body region point N3 corresponds to a right ear. The body region point N4 corresponds to a left ear. The body region point N5 corresponds to a nose. The body region point N6 corresponds to a right eye. The body region point N7 corresponds to a left eye. The body region point N8 corresponds to a right elbow. The body region point N9 corresponds to a right wrist. The body region point N10 corresponds to a left elbow. The body region point N11 corresponds to a left wrist. The body region point N12 corresponds to a right hip. The body region point N13 corresponds to a left hip. The body region point N14 corresponds to a right knee. The body region point N15 corresponds to a left knee. The body region point N16 corresponds to a right ankle. The body region point N17 corresponds to a left ankle. Further, the body region point M0 corresponds to a mid-point between the body region point N1 and the body region point N12, namely, a right chest. The body region point M1 corresponds to a mid-point between the body region point N2 and the body region point N13, namely, a left chest. The body region point M2 corresponds to a mid-point between the body region point N1 and the body region point N8, namely, an upper right arm. The body region point M3 corresponds to a mid-point between the body region point N8 and the body region point N9, namely, a right forearm. The body region point M4 corresponds to a mid-point between the body region point N2 and the body region point N10, namely, an upper left arm. The body region point M5 corresponds to a mid-point between the body region point N10 and the body region point N11, namely, a left forearm. The body region point M6 corresponds to a mid-point between the body region point N12 and the body region point N14, namely, a right thigh. The body region point M7 corresponds to a mid-point between the body region point N14 and the body region point N16, namely, a lower right leg. The body region point M8 corresponds to a mid-point between the body region point N13 and the body region point N15, namely, a left thigh. The body region point M9 corresponds to a mid-point between the body region point N15 and the body region point N17, namely, a lower left leg.

That is, the "plurality of predetermined body region points" include a "first group" composed of the body region points N0 to N17 not including the mid-points and a "second group" composed of the body region points M0 to M9 which are mid-points.

Thus, when the image includes human full body images of five persons, the acquiring unit 11 may acquire five sets of information each including the positions and the body region types of the detection points respectively corresponding to the body region points N0 to N17 and M0 to M9.

Returning to the description of FIG. 2, the control unit 21 classifies the respective detection points into one of the plurality of humans to thereby identify a pose of the human.

For example, the control unit 21 includes a basic pattern extracting unit 25 and a grouping unit 26.

The basic pattern extracting unit 25 extracts a "basic pattern" for each human from the plurality of detection points acquired by the acquiring unit 11.

For example, as shown in FIG. 2, the basic pattern extracting unit 25 includes a basic pattern candidate identifying unit 25A, a base length calculating unit 25B, and a basic pattern forming unit 25C.

The basic pattern candidate identifying unit 25A identifies a plurality of "basic pattern candidates" by classifying, into the same basic pattern candidate, each combination which includes detection points that are close in distance to each other in the image from among a plurality of combinations of the plurality of detection points corresponding to the reference body region type and the plurality of detection points corresponding to the respective base body region types. The "reference body region type" is, for example, the neck, and the "base body region types" are the right shoulder, the left shoulder, the right ear, and the left ear. For example, the basic pattern candidate identifying unit 25A selects, for one detection point corresponding to the neck, one detection point corresponding to the right shoulder that is closest in distance to the one detection point corresponding to the neck from among the plurality of detection points corresponding to the right shoulder. This selection is made for each detection point corresponding to the neck. Then, when one detection point corresponding to the right shoulder is selected for the plurality of detection points corresponding to the neck, the basic pattern candidate identifying unit 25A selects one detection point corresponding to the neck that is closest in distance to the above-mentioned detection point corresponding to the right shoulder from among the plurality of detection points corresponding to the neck. That is, the basic pattern candidate identifying unit 25A performs processing using the MLMD (Mutual-Local-Minimum-Distance) algorithm. Thus, one detection point corresponding to the neck and one detection point corresponding to the right shoulder are selected, and these detection points are classified into the same "basic pattern candidate". The processing described above is performed for each of the left shoulder, the right ear, and the left ear.

The basic pattern forming unit 25C performs "optimization processing" on a plurality of basic pattern candidates identified by the basic pattern candidate identifying unit 25A to thereby form a plurality of basic patterns for the plurality of humans.

The "optimization processing" includes the following processes. A first process is a process of cutting one basic pattern candidate including the plurality of detection points corresponding to the reference body region type to convert the one basic pattern candidate into a plurality of the basic pattern candidates each including one detection point corresponding to the reference body region type. That is, when one basic pattern candidate includes a plurality of detection points corresponding to the neck, the one basic pattern candidate is converted into a plurality of basic pattern candidates each including one detection point corresponding to the neck.

A second process is a process of excluding, from each basic pattern candidate, a detection point(s) that is included in the basic pattern candidate, that corresponds to the base body region type, and whose distance from the detection point corresponding to the reference body region type is longer than a "base length for the basic pattern candidate".

A third process is a process of excluding a basic pattern candidate(s) not including any of a combination of three detection points of a "first body region type group" and a combination of three detection points of a "second body region type group". For example, the "first body region type group" includes the neck, the left shoulder, and the left ear, and the "second body region type group" includes the neck, the right shoulder, and the right ear.

The base length calculating unit 25B calculates the "base length for each basic pattern candidate" when the above-described first process is completed. The calculation of the "base length for each basic pattern candidate" will be described in detail later.

The grouping unit 26 associates a detection point (i.e., grouping target point) not included in the plurality of basic patterns for the plurality of humans extracted by the basic pattern extracting unit 25 with any one of a plurality of "person groups" including respectively the plurality of basic patterns. For example, the following "grouping criteria" are used for this grouping process. The criteria are: a large/small relation between a distance between the grouping target point and a "predetermined body region point" included in each person group and a "allowable maximum length based on the base length" corresponding to the basic pattern of each person group; and whether there is a detection point corresponding to the mid-point in a "predetermined middle area" including a mid-point between the grouping target point and the above predetermined body region point included in each person group. This grouping process is performed in a stepwise manner from the detection point of the body region type close in distance to the basic pattern. That is, for example, first, the detection point corresponding to the hip is set as the grouping target point, and is associated with any one of the plurality of person groups. For example, the above-mentioned "predetermined body region point" used at this time is the body region point corresponding to the shoulder included in each person group and "mid-point" used at this time is the body region point corresponding to the chest. Next, the detection point corresponding to the knee is set as the grouping target point, and is associated with any one of the plurality of person groups. For example, the above-mentioned "predetermined body region point" used at this time is the body region point corresponding to the hip included in each person group and "mid-point" used at this time is the body region point corresponding to the thigh. This grouping process will be described in detail later.

Operation Example of Pose Identifying Apparatus

Figure 4:
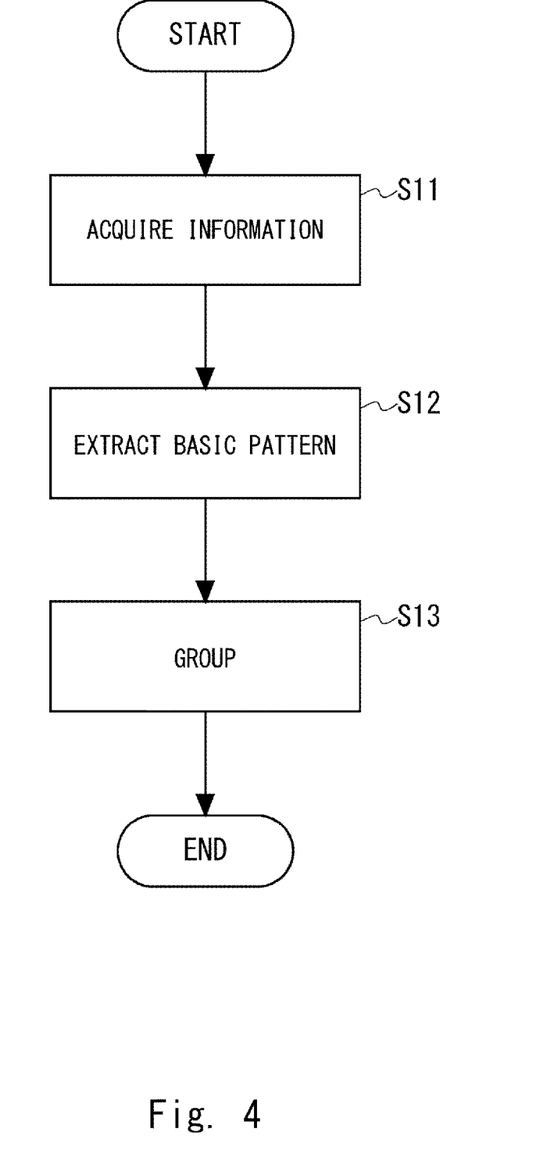
FIG. 4 is a flowchart showing an example of a processing operation of a pose identifying apparatus according to the second embodiment.

An example of a processing operation of the pose identifying apparatus 20 including the above configuration will be described. FIG. 4 is a flowchart showing an example of the processing operation of the pose identifying apparatus according to the second embodiment.

<Information Acquisition Processing>

The acquiring unit 11 acquires information about the position and the body region type of the "plurality of detection points" in each image (Step S11).

<Basic Pattern Extraction Process>

The basic pattern extracting unit 25 extracts the "basic pattern" for each human from the plurality of detection points acquired by the acquiring unit 11 (Step S12).

Figure 5:
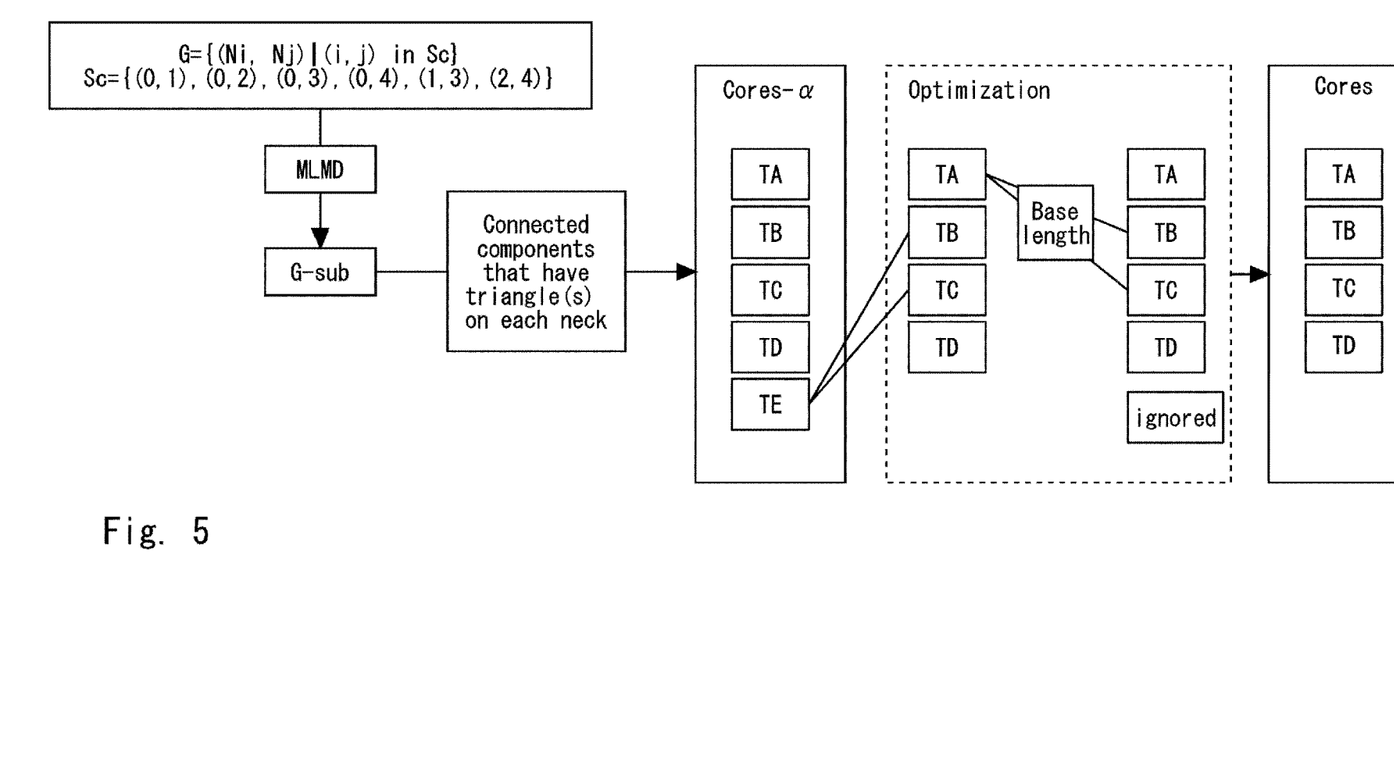
FIG. 5 is a diagram for describing an extraction process of a basic pattern.

FIG. 5 is a diagram for describing the basic pattern extraction process.

First, the basic pattern extraction process starts from a graph G shown in FIG. 5. The graph G includes all detection point pairs corresponding to a group Sc of a "body region type pair". The group Sc includes, as group elements, a pair of the neck and right shoulder, a pair of the neck and left shoulder, a pair of the neck and right ear, a pair of the neck and left ear, a pair of the right shoulder and right ear, and a pair of the left shoulder and left ear.

Next, the basic pattern candidate identifying unit 25A performs the processing using the MLMD algorithm on each body region type pair to obtain a graph G-sub, and identifies, as the "basic pattern candidate", a block including a triangle(s) having the respective detection points corresponding to the neck in the graph G-sub as vertexes.

Figure 6:
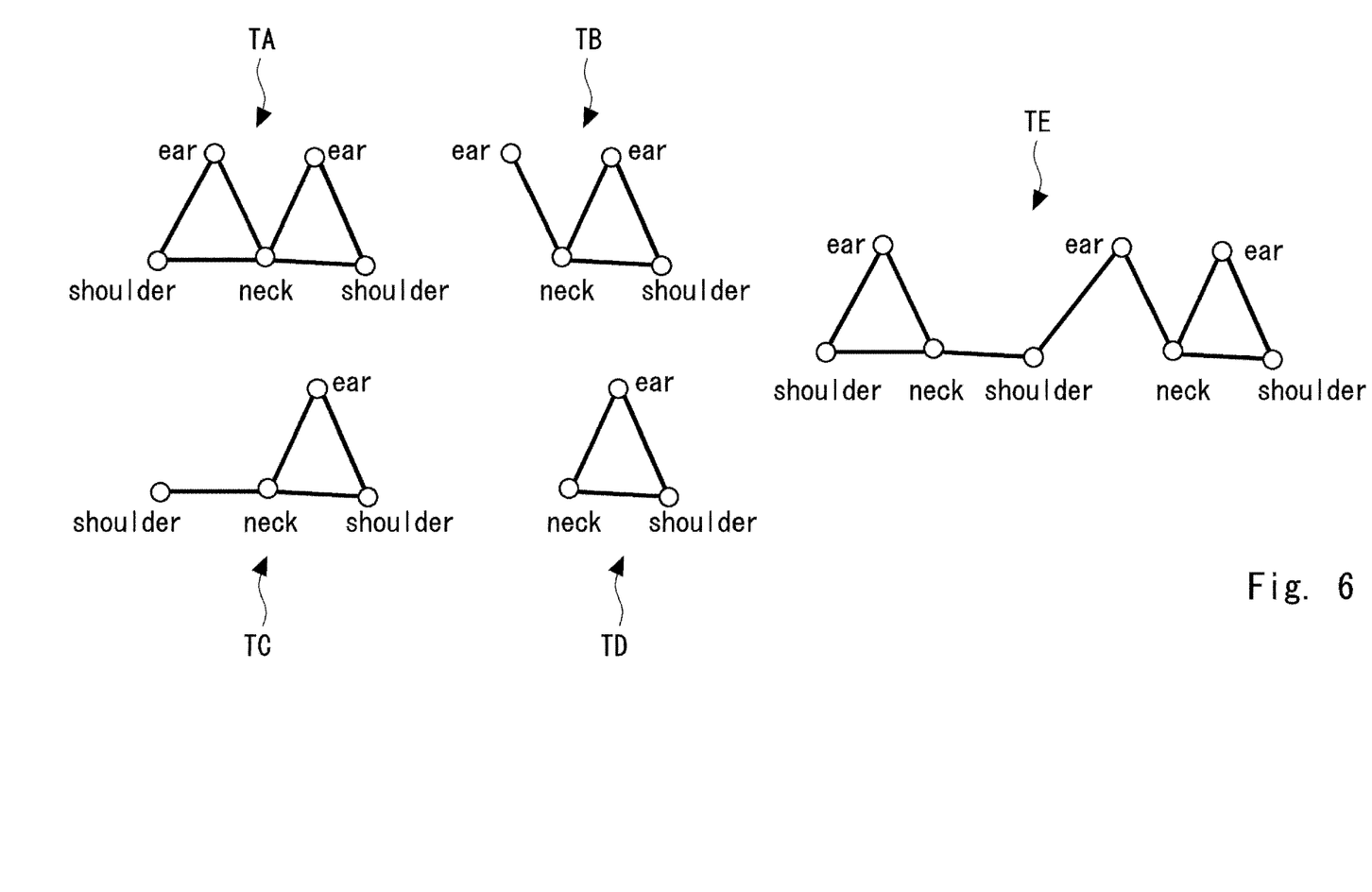
FIG. 6 is a diagram for describing types of basic pattern candidates.

FIG. 6 is a diagram for describing types of the basic pattern candidates. As shown in FIG. 6, there may be five types of the basic pattern candidates, which are TA, TB, TC, TD, and TE. In FIG. 5, these five types of the basic pattern candidates are collectively referred to as "Cores-α". For example, the basic pattern candidate corresponding to the person facing the front is likely to be the type TA. There are basic pattern candidates of the types TB, TC, and TD due to occlusions and the like.

Then, the basic pattern forming unit 25C performs the optimization processing on "Cores-α" to form the plurality of basic patterns.

In the optimization processing, first, since the basic pattern candidate of the type TE shown in FIG. 5 includes two detection points corresponding to the neck, the basic pattern forming unit 25C divides the basic pattern candidate of the type TE into two basic pattern candidates each including one detection point corresponding to the neck (the above-described first process). Then, the basic pattern candidate of the type TB and the basic pattern candidate of the type TC are obtained. As a result, basic pattern candidates corresponding to the types TA, TB, TC, and TD remain.

Next, the basic length calculating unit 25B calculates the "base length" for each basic pattern candidate corresponding to any one of the types TA, TB, TC, and TD. The "base length" is a length that is a reference of a size of a human body.

Figure 7:
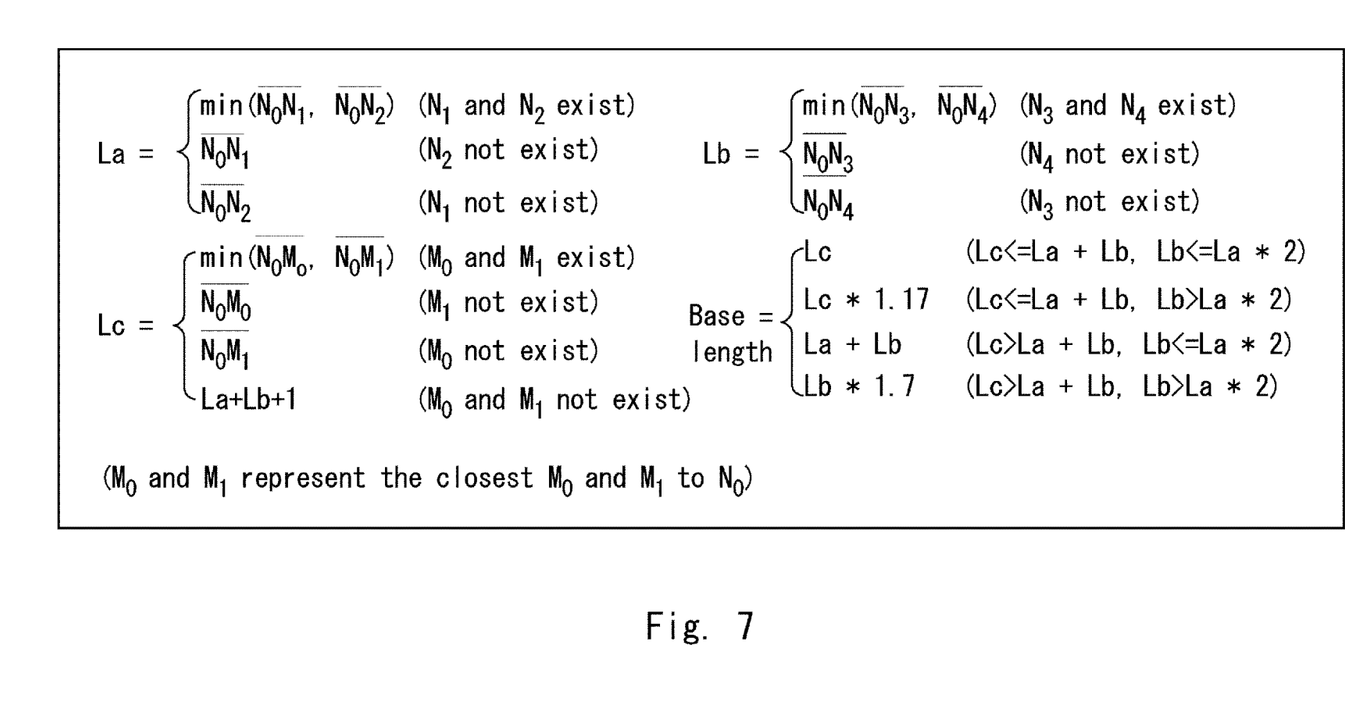
FIG. 7 is a diagram for describing calculation of a base length.

FIG. 7 is a diagram for describing the calculation of the base length. First, the base length calculating unit 25B calculates lengths La, Lb, and Lc for each basic pattern candidate.

As shown in FIG. 7, the length La is calculated as a distance between the body region point N0 corresponding to the neck and the body region point N1 corresponding to the right shoulder in the basic pattern candidate or a distance between the body region point N0 corresponding to the neck and the body region point N2 corresponding to the left shoulder in the basic pattern candidate. Specifically, when the basic pattern candidate includes both the body region point N1 corresponding to the right shoulder and the body region point N2 corresponding to the left shoulder, the length La is equal to the smaller one of the distance between the body region point N0 corresponding to the neck and the body region point N1 corresponding to the right shoulder and the distance between the body region point N0 corresponding to the neck and the body region point N2 corresponding to the left shoulder. When the basic pattern candidate includes the body region point N1 corresponding to the right shoulder but does not include the body region point N2 corresponding to the left shoulder, the length La is the distance between the body region point N0 corresponding to the neck and the body region point N1 corresponding to the right shoulder. When the basic pattern candidate includes the body region point N2 corresponding to the left shoulder but does not include the body region point N1 corresponding to the right shoulder, the length La is the distance between the body region point N0 corresponding to the neck and the body region point N2 corresponding to the left shoulder.

As shown in FIG. 7, the length Lb is calculated as a distance between the body region point N0 corresponding to the neck and the body region point N3 corresponding to the right ear in the basic pattern candidate or a distance between the body region point N0 corresponding to the neck and the body region point N4 corresponding to the left ear in the basic pattern candidate.

As shown in FIG. 7, the length Lc is calculated as, when there is a detection point corresponding to the chest, a distance between the body region point N0 corresponding to the neck in the basic pattern candidate and the body region point M0 that corresponds to the right chest and that is closest to the body region point N0 or a distance between the body region point N0 corresponding to the neck in the basic pattern candidate and the body region point M1 that corresponds to the left chest and that is closest to the body region point N0. Further, when there is no detection point corresponding to the chest, the length Lc is calculated as Lc=La+Lb+1.

Next, the base length calculating unit 25B calculates the base length of each basic pattern candidate based on the calculated lengths La, Lb, and Lc. The base length calculating unit 25B calculates the base length by different calculation methods according to a large/small relation between "Lc" and "La+Lb" and a large/small relation between "Lb" and "La×2". As shown in FIG. 7, for example, when "Lc" is "La+Lb" or less and "Lb" is "La×2" or less, the base length is "Lc". When "Lc" is "La+Lb" or less and "Lb" is larger than "La×2", the base length is "Lc×1.17". When "Lc" is larger than "La+Lb" and "Lb" is "La×2" or less, the base length is "La+Lb". When "Lc" is larger than "La+Lb" and "Lb" is larger than "La×2", the base length is "Lb×1.7". In this example, "Lb" tends to be larger than "La×2" for the basic pattern candidates corresponding to a person facing sideways. Further, "Lb" tends to be "La×2" or less for basic pattern candidates corresponding to a person facing forward or backward. There are cases in which, in the basic pattern candidates corresponding to a person shown at a lower part of the image, his/her chest may not be shown in the image. In this case, "Lc" tends to be larger than "La+Lb".

Returning to the description of FIG. 5, the basic pattern forming unit 25C excludes, from each basic pattern candidate, a detection point(s) that is included in the basic pattern candidate, that corresponds to the base body region type, and whose distance from the detection point corresponding to the reference body region type is longer than the "base length for the basic pattern candidate" (the above second process). Then, for example, in the basic pattern candidate of the type TA including two triangles shown in FIG. 6, when the detection point corresponding to the ear included in one of the triangles is far from the detection point corresponding to the neck, this detection point corresponding to the ear is excluded from the basic pattern candidate. Thus, the basic pattern candidate of the type TA is changed to the basic pattern candidate of the type TC. Further, for example, in the basic pattern candidate of the type TA including two triangles, when the detection point corresponding to the shoulder included in one of the triangles is far from the detection point corresponding to the neck, this detection point corresponding to the shoulder is excluded from the basic pattern candidate. Thus, the basic pattern candidate of the type TA is changed to the basic pattern candidate of the type TB. The basic pattern candidate not including any triangle may appear as a result of the processing by this basic pattern forming unit 25C.

The basic pattern forming unit 25C excludes the basic pattern candidate(s) not including any of the combination of the three detection points of the "first body region type group" and the combination of the three detection points of the "second body region type group (the above-described third process). The "first body region type group" includes the neck, the left shoulder, and the left ear, and the "second body region type group" includes the neck, the right shoulder, and the right ear. That is, the basic pattern forming unit 25C excludes the basic pattern candidate(s) not including any of the above triangles. At this stage, as shown in FIG. 5, four types of the basic pattern candidates, i.e., the types TA, TB, TC, and TD, may remain. These remaining basic pattern candidates are the "basic patterns". In FIG. 5, these four types of basic patterns are collectively referred to as "Cores".

<Grouping Process>

The grouping unit 26 associates a detection point (i.e., grouping target point) not included in the plurality of basic patterns for the plurality of humans extracted by the basic pattern extracting unit 25 with any one of the plurality of "person groups" including respectively the plurality of basic patterns (Step S13).

Figure 8:
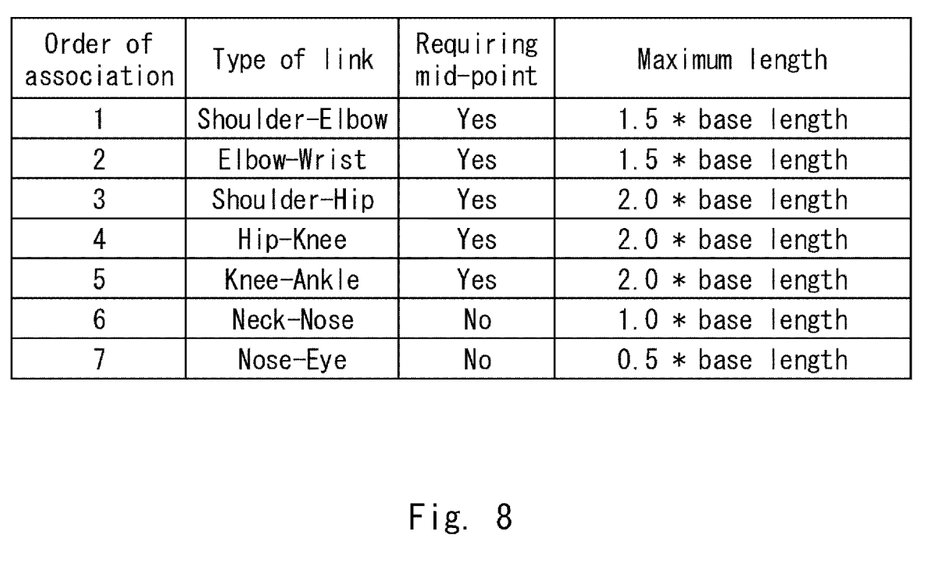
FIG. 8 is a diagram showing an example of a grouping rule table.

Specifically, the grouping unit 26 sequentially selects the body region types to be grouped in accordance with a predetermined "order of association". FIG. 8 is a diagram showing an example of a grouping rule table. As shown in FIG. 8, the first order of association is a "shoulder-elbow" link. Thus, the "elbow" is first selected as the body region type to be grouped.

When the body region type to be grouped is selected, a process of a stage 1 and a process of a stage 2 are executed. That is, the process of the stage 1 and the process of the stage 2 are executed for each body region type to be grouped.

First, the process of the stage 1 will be described.

Firstly, the grouping unit 26 calculates distances (hereinafter referred to as "link distances") for all combinations of the plurality of detection points corresponding to the right shoulder of the plurality of person groups and the plurality of detection points (i.e., grouping target points) corresponding to the right elbow. Further, the grouping unit 26 calculates the "allowable maximum length" of the "shoulder-elbow" link for each combination. The "allowable maximum length" is calculated based on the base length of the basic pattern including the detection point corresponding to the right shoulder included in each combination. For example, as shown in FIG. 8, the "allowable maximum length" of the "shoulder-elbow" link is calculated by "1.5× base length".

Next, the grouping unit 26 excludes a combination(s) whose link distance(s) is larger than the allowable maximum length, and defines the remaining combination(s) as "candidate link(s)".

Figure 9:
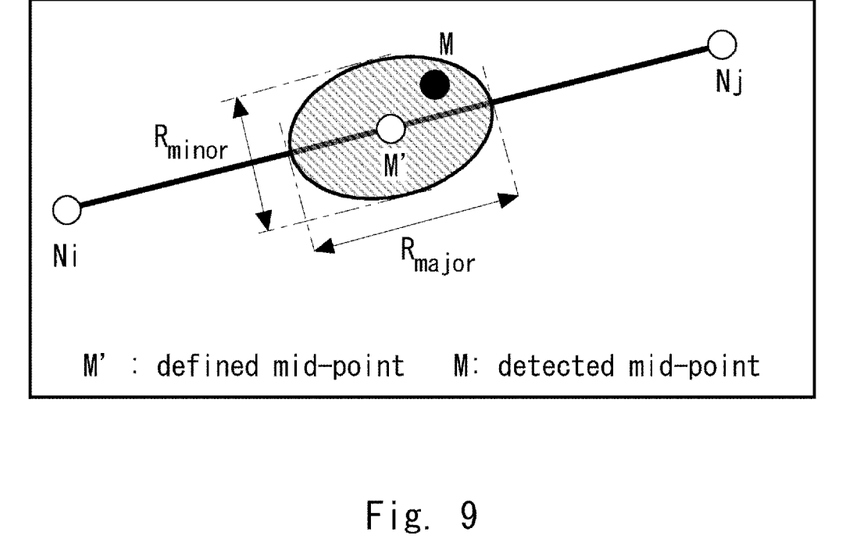
FIG. 9 is a diagram for describing a middle area.

Next, the "middle area" is calculated for each candidate link. FIG. 9 is a diagram for describing the middle area. As shown in FIG. 9, the middle area corresponding to the candidate link is an oblong area centered on a mid-point M' between two detection points Ni and Nj of the candidate link. In the example shown in FIG. 9, a major axis length Rmajor of the middle area is "link distance×0.75", and a minor axis length Rminor is "link distance×0.35".

Next, the grouping unit 26 determines whether a "mid-point M" exists in the middle area of the candidate link. When the candidate link is the "right shoulder-right elbow" link, the "mid-point" is a detection point corresponding to the upper right arm. As shown in FIG. 8, since the item "Requiring mid-point" of the "shoulder-elbow" link is "yes", determination using this "mid-point" is performed.

Next, the grouping unit 26 excludes the candidate link(s) in which no mid-point exists in the middle area. When there are a plurality of candidate links including the same grouping target point among the remaining candidate links, the grouping unit 26 excludes the candidate link(s) other than the candidate link having the smallest link distance from among the plurality of candidate links. Then, the grouping unit 26 defines the remaining candidate link as a "final candidate link". The grouping target point included in the final candidate link are associated with (included in) the person group in which another detection point of the final candidate link is already included.

Next, the process of the stage 2 will be described. In the process of the stage 1, there may be a detection point corresponding to the right elbow which has not been associated with any person group. Further, in the process of the stage 1, there may be a person group that has not been associated with any detection point corresponding to the right elbow. In the process of the stage 2, the same process as the process of the stage 1 is repeated using these detection points corresponding to the right elbow and the detection point corresponding to the right shoulder of the person group. However, in the process of the stage 2, the determination process using the above "mid-point" is not performed.

As described above, when the process of the stage 1 and the process of the stage 2 are completed for the "right shoulder-right elbow" link, the process of the stage 1 and the process of the stage 2 are performed for the "left shoulder-left elbow" link. Next, the process of the stage 1 and the process of the stage 2 are sequentially performed for the "elbow-wrist" link and so on in accordance with the "order of association". Here, as shown in FIG. 8, since the item "Requiring mid-point" of the "neck-nose" link and the "nose-eye" link is "no", this determination using the "mid-point" is not performed in the process of the stage 1. Thus, the process of the stage 2 may be omitted.

In the above description, although the description has been made assuming that the determination is performed using the "mid-point", the present disclosure is not limited to this, and the determination using the "mid-point" may not be performed. That is, the above "grouping criteria" may be a large/small relation between a distance between the grouping target point and the "predetermined body region point" included in each person group and the "allowable maximum length based on the base length" corresponding to the basic pattern of each person group.

<Usefulness of Pose Identifying Apparatus>

The pose identifying apparatus 20 identifies a pose of a person using the image including a plurality of low-resolution person images in a COCO validation set 2014. The "low-resolution person image" here is an image input to the neural network (not shown) in which a "bounding box" of a person is less than 4000 pixels. The number of correctly grouped person groups and the number of incorrectly grouped person groups are manually counted. Here, being "correctly grouped" means that all visible body region points for one person are detected, and all these detected body region points are grouped into the same person group. Being "incorrectly grouped" means that a plurality of detection points for one person are grouped into a plurality of person groups. The number of correctly grouped person groups increases by 77%, and the number of incorrectly grouped people groups decreases by 40% as compared to the case in which OpenPose developed at Carnegie Mellon University (CMU) is used.

Other Embodiments

Figure 10:
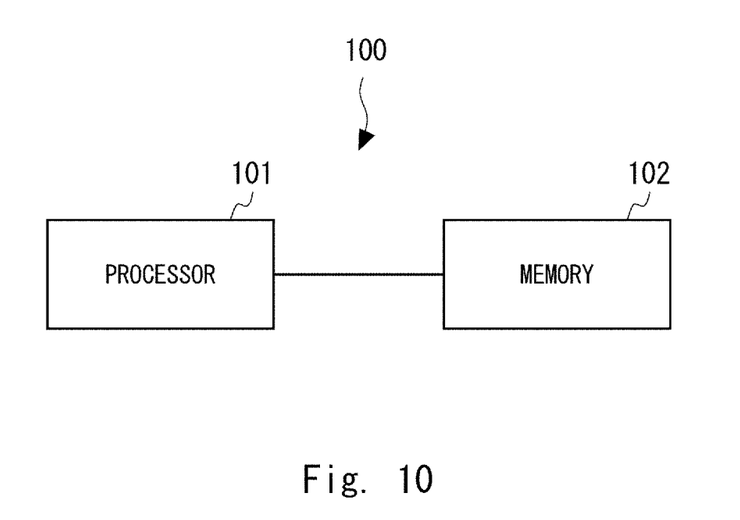
FIG. 10 is a diagram showing an example of a hardware configuration of the pose identifying apparatus.

FIG. 10 is a diagram showing an example of a hardware configuration of the pose identifying apparatus. In FIG. 10, the pose identifying apparatus 100 includes a processor 101 and a memory 102. The processor 101 may be, for example, a microprocessor, a Micro Processing Unit (MPU), or a Central Processing Unit (CPU). The processor 101 may include a plurality of processors. The memory 102 is composed of a combination of a volatile memory and a non-volatile memory. The memory 102 may include a storage located separated from the processor 101. In this case, the processor 101 may access the memory 102 via an I/O interface (not shown).

Each of the pose identifying apparatuses 10 according to the first embodiment and the pose identifying apparatuses 20 according to the second embodiment can include the hardware configuration shown in FIG. 10. The acquiring unit 11 and the control units 12 and 21 of the pose identifying apparatuses 10 and 20 according to the first and second embodiments may be achieved by the processor 101 reading a program stored in the memory 102 and executing it. The program can be stored and provided to the pose identifying apparatuses 10 and 20 using any type of non-transitory computer readable media.

Examples of non-transitory computer readable media include magnetic storage media (such as floppy disks, magnetic tapes, hard disk drives, etc.), and optical magnetic storage media (e.g. magneto-optical disks). Examples of non-transitory computer readable media further include CD-ROM (Read Only Memory), CD-R, and CD-R/W. Examples of non-transitory computer readable media further include semiconductor memories. The semiconductor memories include, for example, mask ROM, PROM (Programmable ROM), EPROM (Erasable PROM), flash ROM, RAM (Random Access Memory), etc.). The program may be provided to the pose identifying apparatuses 10 and 20 using any type of transitory computer readable media. Non-transitory computer readable media include any type of tangible storage media. Transitory computer readable media can provide the program to the pose identifying apparatuses 10 and 20 via a wired communication line (e.g. electric wires, and optical fibers) or a wireless communication line.

Although the present disclosure has been described with reference to the embodiments so far, the present disclosure is not limited by the above. Various modifications that can be understood by a person skilled in the art within the scope of the present disclosure can be made to the configuration and details of the present disclosure.

The whole or part of the embodiments disclosed above can be described as, but not limited to, the following supplementary notes.

(Supplementary Note 1)

A pose identifying apparatus comprising:
  acquiring means for acquiring information about a position and a body region type of each of a plurality of detection points detected for a plurality of predetermined body region points for a human in an image, where the image includes a plurality of person images respectively corresponding to a plurality of humans; and
  control means for identifying a pose of each human by classifying the respective detection points into any one of the plurality of humans, wherein
  the control means comprises basic pattern extracting means for extracting a basic pattern for each human, and
the basic pattern includes a reference body region point and a plurality of base body region points, where the reference body region point corresponds to a reference body region type, and the plurality of base body region points corresponds to a plurality of base body region types that are different from the reference body region type and that are different from each other.

(Supplementary Note 2)

The pose identifying apparatus according to Supplementary note 1, wherein the basic pattern extracting means comprises:
  basic pattern candidate identifying means for identifying a plurality of basic pattern candidates by classifying, into the same basic pattern candidate, combination which includes detection points that are close in distance to each other in the image from among a plurality of combinations of the plurality of detection points corresponding to the reference body region type and the plurality of detection points corresponding to the respective base body region types; and
  basic pattern formation means for forming the plurality of basic patterns for the plurality of humans by performing optimization processing on the identified plurality of basic pattern candidates.

(Supplementary Note 3)

The pose identifying apparatus according to Supplementary note 2, wherein the optimization processing comprises:
  dividing one basic pattern candidate including the plurality of detection points corresponding to the reference body region type and converting the one basic pattern candidate into the plurality of basic pattern candidates each including one detection point corresponding to the reference body region type;
  excluding, from each basic pattern candidate, the detection point that is included in the basic pattern candidate, that corresponds to the base body region type, and whose distance from the detection point corresponding to the reference body region type is longer than a base length for the basic pattern candidate; and
  excluding the basic pattern candidate not including any of a combination of three detection points which belong to a first body region type group and a combination of three detection points which belong to a second body region type group.

(Supplementary Note 4)

The pose identifying apparatus according to Supplementary note 3, wherein the reference body region type is a neck, the base body region types are a left shoulder, a right shoulder, a left ear, and a right ear, the first body region type group includes the neck, the left shoulder, and the left ear, and the second body region type group includes the neck, the right shoulder, and the right ear.

(Supplementary Note 5)

The pose identifying apparatus according to any one of Supplementary notes 1 to 4, wherein the control means comprises grouping means for associating a grouping target point, which is a detection point not included in the extracted plurality of basic patterns for the plurality of humans, with any one of a plurality of person groups including respectively the plurality of basic patterns, and the grouping means associates the grouping target point with one of the plurality of person groups based on an allowable maximum length and a distance between the grouping target point and a predetermined body region point included in the person group, where the allowable maximum length is based on a base length corresponding to the basic pattern of the person group.

(Supplementary Note 6)

The pose identifying apparatus according to any one of Supplementary notes 1 to 4, wherein the plurality of predetermined body region points include a plurality of body region points that corresponds to a plurality of predetermined body region types and which belongs to a first group, and include a body region point which corresponds to a mid-point between two body region points corresponding to two particular body region types and which belongs to a second group, the control means comprises grouping means for associating a grouping target point, which is a detection point not included in the extracted plurality of basic patterns for the plurality of humans, with one of a plurality of person groups including respectively the plurality of basic patterns based on grouping criteria, and the grouping criteria is a large/small relation between an allowable maximum length and a distance between the grouping target point and a predetermined body region point included in the person group and whether there is a detection point corresponding to the mid-point in a predetermined middle area, where the predetermined middle area includes a mid-point between the grouping target point and the predetermined body region point included in the person group, and the allowable maximum length is based on a base length corresponding to the basic pattern of the person group.

(Supplementary Note 7)

The pose identifying apparatus according to Supplementary note 6, wherein, at an initial stage of a grouping process by the grouping means, the grouping target point, which is the detection point not included in the plurality of basic patterns, is a body region point corresponding to a hip as the body region type, and the mid-point is a body region point corresponding to a chest as the body region type.

(Supplementary Note 8)

The pose identifying apparatus according to Supplementary note 5 or 6, wherein the control means comprises base length calculating means for calculating a base length corresponding to each of the basic patterns based on a reference body region point corresponding to the neck as the reference body region type, a base body region point corresponding to the shoulder as the base body region type, and a body region point corresponding to the chest as the body region type.

(Supplementary Note 9)

The pose identifying apparatus according to Supplementary note 1, wherein the basic pattern includes at least one of a combination of a reference body region point corresponding to a neck as the reference body region type and two base body region points corresponding to a left shoulder and a left ear as the base body region type and a combination of the reference body region point corresponding to the neck as the reference body region type and two base body region points corresponding to a right shoulder and a right ear as the base body region type.

(Supplementary Note 10)

A pose identifying method comprising:

acquiring information about a position and a body region type of each of a plurality of detection points detected for a plurality of predetermined body region points for a human in an image, where the image includes a plurality of person images respectively corresponding to a plurality of humans; and identifying a pose of each human by classifying the respective detection points into any one of the plurality of humans, wherein the identifying of the pose of each human comprises extracting a basic pattern for each human, and the basic pattern includes a reference body region point and a plurality of base body region points, where the reference body region point corresponds to a reference body region type, and the plurality of base body region points corresponds to a plurality of base body region types that are different from the reference body region type and that are different from each other.

(Supplementary Note 11)

A non-transitory computer readable medium storing a program that causes a pose identifying apparatus to execute processing comprising:

acquiring information about a position and a body region type of each of a plurality of detection points detected for a plurality of predetermined body region points for a human in an image, where the image includes a plurality of person images respectively corresponding to a plurality of humans; and identifying a pose of each human by classifying the respective detection points into any one of the plurality of humans, wherein the identifying of the pose of each human comprises extracting a basic pattern for each human, and the basic pattern includes a reference body region point and a plurality of base body region points, where the reference body region point corresponds to a reference body region type, and the plurality of base body region points corresponds to a plurality of base body region types that are different from the reference body region type and that are different from each other.

REFERENCE SIGNS LIST

10 POSE IDENTIFYING APPARATUS
11 ACQUIRING UNIT
12 CONTROL UNIT
15 BASIC PATTERN EXTRACTING UNIT
20 POSE IDENTIFYING APPARATUS
21 CONTROL UNIT
25 BASIC PATTERN EXTRACTING UNIT
25A BASIC PATTERN CANDIDATE IDENTIFYING UNIT
25B BASE LENGTH CALCULATING UNIT
25C BASIC PATTERN FORMING UNIT
26 GROUPING UNIT

What is claimed is:

1. A pose identifying apparatus comprising:
at least one memory storing instructions; and
at least one processor configured to execute, according to the instructions, a process comprising:
acquiring information about a position and a body region type of each of a plurality of detection points detected for a plurality of predetermined body region points for a human in an image, where the image includes a plurality of person images respectively corresponding to a plurality of humans; and
first identifying a pose of each human by classifying the respective detection points into any one of the plurality of humans, wherein
the first identifying comprises extracting a basic pattern for each human, and
the basic pattern includes a reference body region point and a plurality of base body region points, where the reference body region point corresponds to a reference body region type, and the plurality of base body region points corresponds to a plurality of base body region types that are different from the reference body region type and that are different from each other.

2. The pose identifying apparatus according to claim 1, wherein the extracting comprises:
second identifying a plurality of basic pattern candidates by classifying, into the same basic pattern candidate, combination which includes detection points that are close in distance to each other in the image from among a plurality of combinations of the plurality of detection points corresponding to the reference body region type and the plurality of detection points corresponding to the respective base body region types; and
forming the plurality of basic patterns for the plurality of humans by performing optimization processing on the identified plurality of basic pattern candidates.

3. The pose identifying apparatus according to claim 2, wherein the optimization processing comprises:
dividing one basic pattern candidate including the plurality of detection points corresponding to the reference body region type and converting the one basic pattern candidate into the plurality of basic pattern candidates each including one detection point corresponding to the reference body region type;
excluding, from each basic pattern candidate, the detection point that is included in the basic pattern candidate, that corresponds to the base body region type, and whose distance from the detection point corresponding to the reference body region type is longer than a base length for the basic pattern candidate; and
excluding the basic pattern candidate not including any of a combination of three detection points which belong to a first body region type group and a combination of three detection points which belong to a second body region type group.

4. The pose identifying apparatus according to claim 3, wherein
the reference body region type is a neck,
the base body region types are a left shoulder, a right shoulder, a left ear, and a right ear,
the first body region type group includes the neck, the left shoulder, and the left ear, and
the second body region type group includes the neck, the right shoulder, and the right ear.

5. The pose identifying apparatus according to claim 1, wherein
the first identifying comprises associating a grouping target point, which is a detection point not included in the extracted plurality of basic patterns for the plurality of humans, with any one of a plurality of person groups including respectively the plurality of basic patterns, and
the associating comprises associating the grouping target point with one of the plurality of person groups based on an allowable maximum length and a distance between the grouping target point and a predetermined body region point included in the person group, where the allowable maximum length is based on a base length corresponding to the basic pattern of the person group.

6. The pose identifying apparatus according to claim 1, wherein
the plurality of predetermined body region points include a plurality of body region points that corresponds to a plurality of predetermined body region types and which belongs to a first group, and include a body region point which corresponds to a mid-point between two body region points corresponding to two particular body region types and which belongs to a second group,
the first identifying comprises associating a grouping target point, which is a detection point not included in the extracted plurality of basic patterns for the plurality of humans, with one of a plurality of person groups including respectively the plurality of basic patterns based on grouping criteria, and
the grouping criteria is a large/small relation between an allowable maximum length and a distance between the grouping target point and a predetermined body region point included in the person group and whether there is a detection point corresponding to the mid-point in a predetermined middle area, where the predetermined middle area includes a mid-point between the grouping target point and the predetermined body region point included in the person group, and the allowable maximum length is based on a base length corresponding to the basic pattern of the person group.

7. The pose identifying apparatus according to claim 6, wherein, at an initial stage of a grouping process by the grouping means, the grouping target point, which is the detection point not included in the plurality of basic patterns, is a body region point corresponding to a hip as the body region type, and the mid-point is a body region point corresponding to a chest as the body region type.

8. The pose identifying apparatus according to claim 5, wherein the first identifying comprises calculating a base length corresponding to each of the basic patterns based on a reference body region point corresponding to the neck as the reference body region type, a base body region point corresponding to the shoulder as the base body region type, and a body region point corresponding to the chest as the body region type.

9. The pose identifying apparatus according to claim 1, wherein the basic pattern includes at least one of a combination of a reference body region point corresponding to a neck as the reference body region type and two base body region points corresponding to a left shoulder and a left ear as the base body region type and a combination of the reference body region point corresponding to the neck as the reference body region type and two base body region points corresponding to a right shoulder and a right ear as the base body region type.

10. A pose identifying method comprising:

acquiring information about a position and a body region type of each of a plurality of detection points detected for a plurality of predetermined body region points for a human in an image, where the image includes a plurality of person images respectively corresponding to a plurality of humans; and identifying a pose of each human by classifying the respective detection points into any one of the plurality of humans, wherein the identifying of the pose of each human comprises extracting a basic pattern for each human, and the basic pattern includes a reference body region point and a plurality of base body region points, where the reference body region point corresponds to a reference body region type, and the plurality of base body region points corresponds to a plurality of base body region types that are different from the reference body region type and that are different from each other.

11. A non-transitory computer readable medium storing a program that causes a pose identifying apparatus to execute processing comprising:

acquiring information about a position and a body region type of each of a plurality of detection points detected for a plurality of predetermined body region points for a human in an image, where the image includes a plurality of person images respectively corresponding to a plurality of humans; and identifying a pose of each human by classifying the respective detection points into any one of the plurality of humans, wherein the identifying of the pose of each human comprises extracting a basic pattern for each human, and the basic pattern includes a reference body region point and a plurality of base body region points, where the reference body region point corresponds to a reference body region type, and the plurality of base body region points corresponds to a plurality of base body region types that are different from the reference body region type and that are different from each other.

* * * * *